H. WILHELM & H. OLANETA.
DRY BATTERY CELL.
APPLICATION FILED NOV. 3, 1914.

1,166,871.

Patented Jan. 4, 1916.

Witnesses:

Inventors:
Henry Wilhelm.
Harold Olaneta.
by their Attorney.

UNITED STATES PATENT OFFICE.

HENRY WILHELM AND HAROLD OLANETA, OF BROOKLYN, NEW YORK.

DRY BATTERY-CELL.

1,166,871. Specification of Letters Patent. Patented Jan. 4, 1916.

Application filed November 3, 1914. Serial No. 870,001.

*To all whom it may concern:*

Be it known that we, HENRY WILHELM and HAROLD OLANETA, citizens of the United States, residing at Brooklyn, in the county of Kings and State of New York, have invented certain new and useful Improvements in Dry Battery-Cells, of which the following is a specification.

This invention relates to dry batteries, more particularly to cells of such batteries, the object of the invention being to provide an improved cell and method of making such cell whereby the manufacture of cells, particularly small cells for batteries, is very much simplified and the expense thereof reduced, while a much longer lived cell is obtained.

One of the old ways of making battery cells is to make a cartridge with a covering of muslin or cheese cloth, then winding thread around the cheese cloth to hold it, and then placing a couple of rubber bands around the cartridge to properly center it in its cup, whereupon the cartridge is soaked for a definite period in an electrolytic solution, and then drained, the soaking being for the purpose of permitting the cartridge to absorb a certain amount of moisture, whereupon paste is put in a zinc cup and the cartridge inserted, the paste being an insulator when in a dry condition and a conductor when wet.

Another way of making battery cells is to line a zinc cup and ram it with a charge of powder. This mode of procedure causes the lining of the cell to become harder and has a tendency to force all the moisture out of the lining. This latter method of procedure is more particularly adapted for large cells and is not practicable for small battery cells. By the present method of procedure, however, the necessity of making a cartridge in the manner hereinbefore described and of inserting it in paste within the zinc cup, is entirely obviated, and, as stated, a much simpler method of procedure obtained and a much longer lived and more practicable cell produced.

Figure 1:
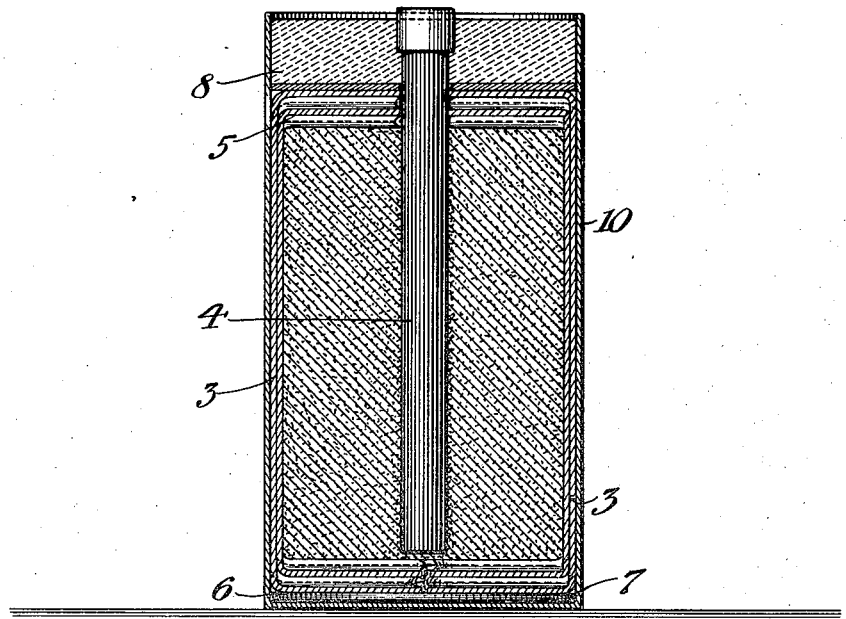
Figure 2:
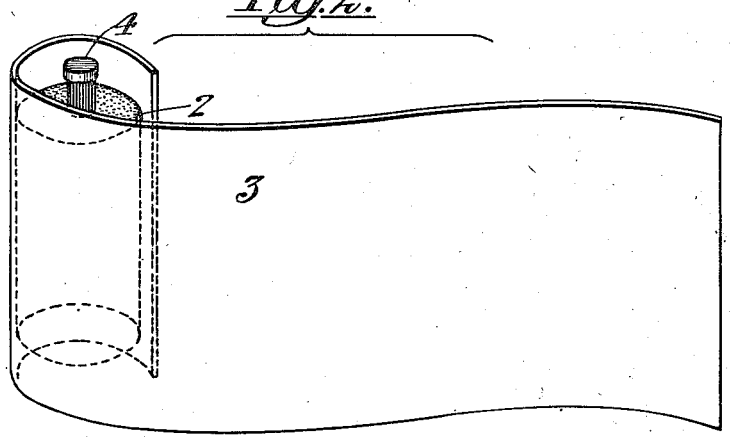
Figures 3, 4:
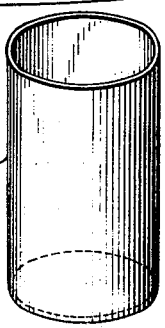

In the drawings accompanying and forming part of this specification, Figure 1 is a sectional view of a cup, such as a zinc cup, with this improved cartridge inserted therein; Fig. 2 illustrates the cartridge in the process of manufacture; Fig. 3 is a view of a zinc cup; and Fig. 4 is a view of an insulating member used in the bottom of the zinc cup.

Similar characters of reference indicate corresponding parts throughout the several figures of the drawings.

In the present improved method the embryo cartridge 2 made of any suitable formula, sufficient to leave it in a reasonably hard condition so that it can be handled to permit it to be wrapped, is wrapped with blotting paper 3, preferably with several layers thereof, of some suitable thickness, a sufficient number of wrappings being placed around the cartridge to insure that it will slip into the zinc cup reasonably tight. When the embryo cartridge having the carbon 4 therein is wrapped with blotting paper 3, the ends thereof are tucked in as at 5 and 6. Prior to the wrapping of the embryo cartridge with the blotting paper, this blotting paper is dipped into an electrolytic solution for a certain period, and this solution is partially forced out, leaving a certain amount of moisture in the blotting paper, and the completely formed cartridge is then slipped into a metal, such as a zinc cup or cell 10, a suitable insulating member 7 such as a piece of blotting paper being first inserted in the bottom of the cup. The cartridge is then pressed firmly into the cup with the result that while the embryo cartridge 2 remains hard, the blotting paper remains soft and thus takes the place of the gelatin or paste heretofore used.

The present method of procedure obviates the necessity of the use of muslin or cheese cloth, the windings of thread, the rubber bands, the paste in the small cells, and the necessity of ramming the charge when a large cell is made.

After the completely formed cartridge is forced into a zinc cup, suitable insulating material is placed on top thereof as at 8, and this cell, together with others, may be used to produce various styles of batteries, particularly small pocket batteries, and tests have disclosed that a battery made with cells of this kind has almost twice the life of batteries heretofore produced made with cells in the ordinary way, since by reason of the fact that there is no necessity for ramming the charge into the cup the cartridge as well as the blotting paper wrapper remain in the same condition in which they were when placed in the cup.

We claim as our invention:

1. The method of making a battery cell, which consists in forming an embryo cartridge having a negative electrode therein forming a center or core, then wrapping it with one or more layers of solution-softened porous material, and then pressing said completely formed cartridge into a metal cup forming a positive electrode thereby to bring the porous material into intimate contact with the cup and embryo cartridge while preserving the moisture in the porous material.

2. The method of making a battery cell, which consists in forming an embryo cartridge having a negative electrode therein forming a center or core, then wrapping it with one or more layers of solution-softened blotting paper, and then pressing said completely formed cartridge into a metal cup forming a positive electrode thereby to bring the blotting paper into intimate contact with the cup and embryo cartridge while preserving the moisture in the blotting paper.

HENRY WILHELM.
HAROLD OLANETA.

Witnesses:
CHAS. W. LA RUE,
WALTER L. BAKELAR.